June 8, 1965      C. R. DOTSON      3,187,452
LUMINOUS LICENSE PLATE AND HOLDER
Filed June 30, 1961      2 Sheets-Sheet 1

Claude R. Dotson
INVENTOR.

BY *Clarence A. O'Brien*
*and Harvey B. Jacobson*
Attorneys

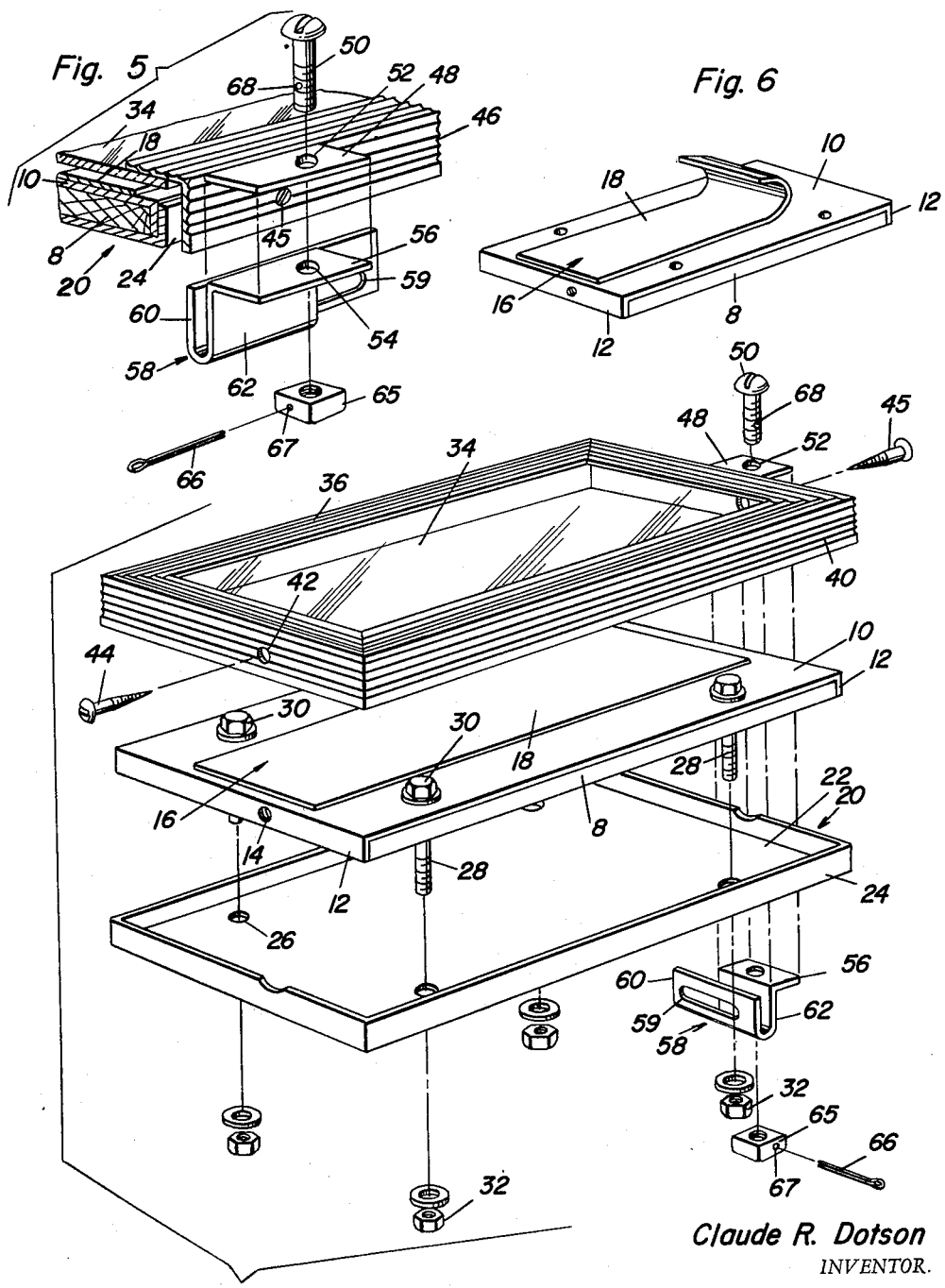

United States Patent Office 3,187,452
Patented June 8, 1965

3,187,452
LUMINOUS LICENSE PLATE AND HOLDER
Claude R. Dotson, Box 222, New Smyrna Beach, Fla.
Filed June 30, 1961, Ser. No. 121,162
7 Claims. (Cl. 40—202)

This invention relates to certain new and useful improvements in a vehicle license plate and a novel protective or theft-proof holder therefor.

Briefly the invention is characterized by a rigid base of a shape comparable with a conventional-type license plate or tag, said base having a flat obverse readily viewable backing surface providing a satisfactory foundation for license data or indicia displaying means which is readily applicable and removable by a duly authorized person. The means preferred comprises a strip of flexible sheet material having luminous or equivalent light emitting media constituting the desired license tag or plate. The usual gummed side of this peelable-type strip, if Scotchlite reflective sheeting is used, is adhesively applied and attached to the above-named surface and, after it has served its prescribed purpose, is merely peeled off and replaced with a corresponding currently authorized strip. The thus prepared base with its accompanying light reflective license strip constitutes the composite license plate and is encased or housed in a tamper-proof and weatherproof enclosure, the latter embodying a receiver or holder in which the base is removably nested, and an attractive cover, the latter embodying a frame or rim which is utilized in such a way as to position and retain a transparent cover, for example, a suitable glass or an equivalent panel.

In carrying out the invention a number of significant features are employed. For example, the construction is such that it should be economical for the State to produce and make available to users. This improved result is predicated in part on the fact that an inexpensive light reflective sheet is preferably used as the "plate" and is mounted on the surface of the base and protected under the glass panel or window and rendered substantially tamper-proof, is kept clean and protected from the elements. Thus constructed the identification data is effectually and distinctly brought into play and at night the self-reflecting properties render the license clearly visible. To this end the conspicuousness thus attained offers definite advantages to law enforcement officers.

It is submitted that if the herein revealed adaptation is endorsed by manufacturers and State authorities and officials and is ultimately installed for use on both front and rear portions of vehicles driven by licensed operators protection and safety thus promoted will induce and justify insurance companies to properly offer reduced rates.

A further objective in the instant matter is to provide a safe and reliable license plate and holder combination which is such in construction and design that it will simplify a State's licensing system in that the owner of the car will purchase a readily openable and closable substantially theft-proof holder which will last almost for the life of the car and will be in a position to easily and readily solve the annual tag changing problem. Moreover and inasmuch as the license plate is in the form of label-like sticker with appropriate identification data, the tags can be readily mailed out to drivers from the traffic bureau or elsewhere in a simple, expedient and economical manner.

Considered somewhat more explicitly and from a structural point of view the present invention pertains to a license tag construction characterized by a base or backing plate having an obverse surface provided with prescribed luminous license indicia or identifying means and a holding and mounting case or housing therefor expressly constructed to enclose the same, a transparent window pane being provided to render the indicia conspicuous and readily viewable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a fragmentary perspective view illustrating a safety-type fastening device with the component parts exploded or shown separately;

FIGURE 6 is a view in perspective of the aforementioned base showing one end of the adhesive strip or tag peeled away from the surface; and FIGURE 7 is an exploded perspective view wherein all of the component parts are shown in cooperative relationship.

Figure 1:
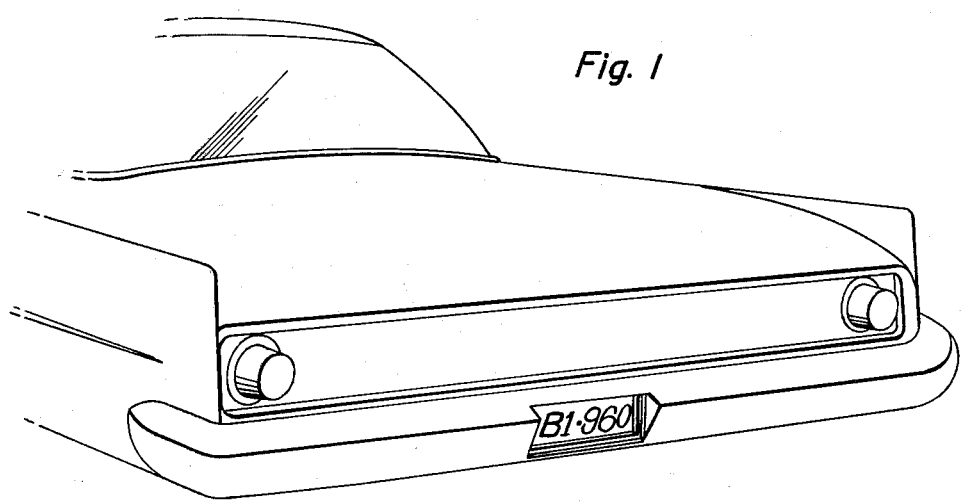
FIGURE 1 is a view in perspective showing the rear end of an automobile or an equivalent vehicle and illustrating the improved luminous license plate and holder in use.
Figure 2:
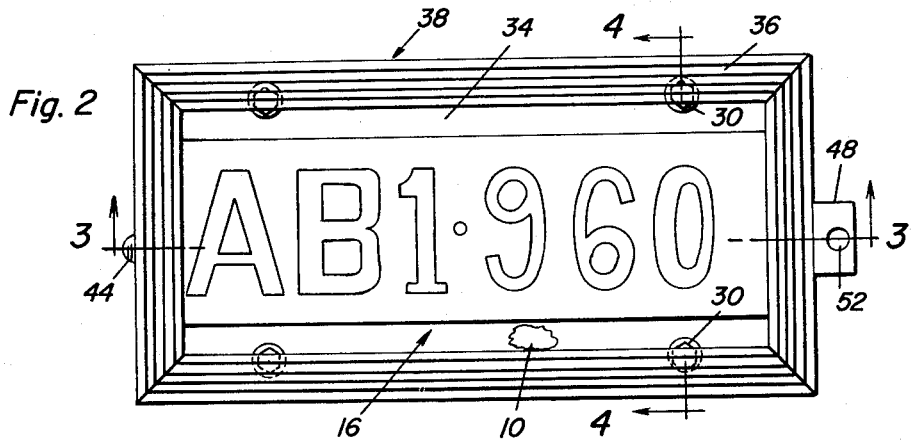
FIGURE 2 is a plan or, alternatively, a face elevation illustrating the appearance of the overall ready-to-use plate and holder combination.

A general and comprehensive understanding of the subject matter of the invention may be had by referring to FIGURE 7 wherein it will be seen that the composite license plate or tag comprises, broadly construed, a base or backing member. More particularly this "base" comprises an economical rectangular wooden or equivalent panel 8 the same being covered on at least one side by a correspondingly shaped and correctly proportioned aluminum or an equivalent flat surfaced plate 10. The end portions 12 are provided with flanges having screw-threaded holes 14. It is on the display or obverse side or surface that the readily applicable and removable identification or license tag 16 is applied. One may properly construe this component 16 as a flexible mailable license plate or tag in that in actual practice the usable side thereof will be provided with the name of the State, issue date, expiration date, identification number or the like constituting the aforementioned license data or indicia. One side of the tag is coated with gum or adhesive and is adhesively attached to the face of the plate 10 in the manner shown. The side or surface 18 which is provided with the aforementioned indicia is the luminous side. In other words the indicia is luminous in character, may be self-luminous by absorbing light during the daylight and emitting the same at night. In fact the desired luminosity could perhaps be obtained by using luminous paint or the like. At present it is contemplated that the desired result will be had by simply using a suitably colored strip of Scotchlite reflecting tape or reflective sheeting as it is perhaps best known in the trade.

The tamper-proof and theft-proofing and also waterproofing holder is preferably of the construction illustrated in the drawing and comprises a pan or tray 20 of a depth to provide a receptacle for the insertable and removable composite license plate or tag. More specifically this part 20 comprises a backing plate 22 with a marginal lateral flange 24, said plate having holes 26 for the screw-threaded shanks 28 of the license plate assembling and retaining bolts 30. The bolts extend through holes in the corner portions of the tag or plate and then through the holes 26 where they are held in place by the assembling and retaining nuts 32. It will be noted that the bolt-heads 30 project above the level of the illuminable tag 16.

Figure 3:
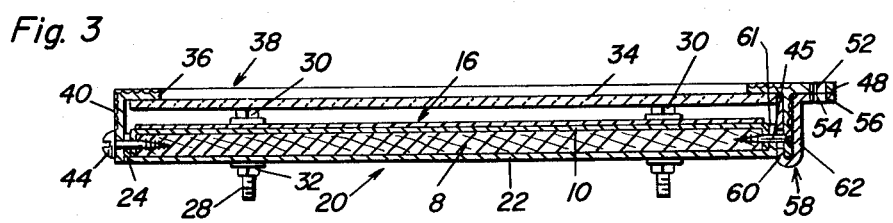
FIGURE 3 is a vertical longitudinal section on the line 3—3 of FIGURE 2.
Figure 4:
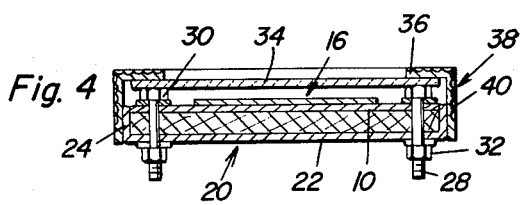
FIGURE 4 is a vertical transverse sectional view taken on the line 4—4 of FIGURE 2.

The cover comprises a glass or an equivalent transparent window or pane 34 which as brought out in FIGURES 3 and 4 is held in place by the embracing horizontal flanges 36 of the angle-shaped members of the frame or rim 38. This frame or rim is preferably made of aluminum the exterior surfaces of which may be ribbed or otherwise ornamented. The vertical flanges 40 embrace or surround the flanges of the receiver or pan 20. Thus the unique license plate or tag is bolted in the pan and the tag and pan fitted telescopically into the rim 38 constituting the frame of the overall cover.

It will be noted that the end members of the rim have holes 42 therein to accommodate the passage of the headed fasteners or screws 44 which are threaded into the screw-threaded sockets 14 in the ends of the license plate base. It will assist in the description, however, by mentioning that the cover attaching and retaining screw 45 at the right is shielded in the manner shown and this construction and arrangement is a theft-proofing and tamper-proofing feature. With reference to FIGURE 5 the end flange 46 has an outstanding lug or ear 48 to accommodate the shank of a bolt 50. This bolt is adapted to pass through the bolt hole 52 and a cooperating bolt hole 54 in a shiftable flange 56 on the safety clip 58. This clip also has a special purpose flange 60 provided with a slot 59. The slotted flange 60 (see FIG. 3) necessitates passing the screw or fastener 45 through the slot and the flange itself is slidingly mounted between the adjacent flange of the tray or pan which flange for this purpose will be designated here as 61. This clip is thus shiftable or slidable so that the companion flange 62 functions as a shield or guard. By passing the bolt 50 through the holes 52 and 54, then applying the lock nut 65, a cotter key 66 may be passed through the hole 67 in the nut and hole 68 provided therefor in the bolt thus securing the locking clip 58 in its safeguarding position.

It would be within the purview of the concept to use, in lieu of the bolt 50 and nut 65, a lead seal and wire (not shown). If the seal were to be broken in order to remove the plate the unauthorized person who would do this could be hailed into court on a breaking and entering charge.

In practice the State can sell the holder and license plate or tag separately. The holder will last for many years and might perhaps be said to last for the life of the car if not damaged and if confined in a license well or depression as shown, for example, in FIGURE 1. The car owner would only have to buy the Scotchlite reflective sheeting with his license number on it and stick it on the surface provided therefor on the backing or plate 10 in the already described manner. Consequently members of the public will benefit and the State will not lose revenue. The inner part of the holder may be constructed of plywood covered on at least one side with sheet aluminum thus making it rattleproof, rustproof and the cover, that is the frame or rim portion, may be made of attractive serviceable aluminum and sealed to the glass.

It is to be pointed out that the heads 30 of the bolts provide a space between the glass panel and the license tag which adds to the theft-proofing aspect of the invention and provides a ventilating and air circulating space to minimize fogging. Ventilating holes (not detailed) may be required to effectively achieve this desired end result.

Authorized removal of the assembling and fastening screws 44 and 45 for the cover permits access to be had to the surface of the tag-attaching plate 10. This tag may be readily peeled off as shown in FIGURE 6 and replaced with a duplicate one in a seemingly obvious manner. The fact that the composite tag, the panel 8, plate 10, and reflective sheeting 16 is bolted by way of the bolts 28 and 30 to the receiver or pan 20 adds to the theft-proofing aspect of the invention. In fact, it would appear that the safeguards provided are adequate in assuring that the invention serves the purposes for which it is intended.

It is believed that a careful consideration of the specification in conjunction with the drawing will enable the reader to obtain a clear and comprehensive understanding of the construction, mode of use and features and advantages of the invention. Under the circumstances a more explicit description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle tag construction comprising, in combination a holder embodying a pan having a receptacle portion, an insertable and removable panel fitted into said receptacle portion, a cover having a glass window and a retaining frame, fastening means securing end portions of the frame to end portions of the panel and threadedly engaged in the panel, and slidingly mounted releasable locking clip means at one end of the frame shielding and partially enclosing the adjacent fastening means to render same accessible or inaccessible as desired.

2. A vehicle tag holder construction comprising a license tag holder and a cover therefor, said holder including a receptacle having a base provided with marginal upstanding side walls, a base plate for supporting a license tag removably received between said side walls, bolts extending through said base plate and through said base with headed ends disposed in said receptacle adjacent said side walls, a cover comprising an open frame having a flat rim overlying said headed ends and preventing removal of said bolts and a depending marginal skirt embracing said side walls, means locking said cover to said receptacle, said locking means including screws extending through said skirt and side walls and into the edge of said base plate, said locking means including an apertured ear projecting laterally from said flat rim, a clip secured to said receptacle and base plate by one of said screws and having an apertured ear projecting therefrom, said clip including a member overlying and partially enclosing the adjacent screw, a locking device secured to said apertured ears.

3. The combination of claim 2 wherein said clip comprises a U-shaped portion having parallel inner and outer flanges, said outer flange comprising said aforementioned member, said one of said screws extending through the inner flange and being covered by said outer flange.

4. A vehicle license tag holder construction consisting of a license tag holder and a removable cover thereon, said holder having a base portion with upstanding marginal walls comprising a receptacle, a base plate for supporting a license tag removably received in said receptacle, fasteners securing said base plate to said base portion, said cover consisting of an open frame having a flat rim overlying said marginal walls and a depending marginal skirt embracing the latter, a transparent pane in said cover interposed between said flat rim and said base plate, means securing said cover to said base plate, said cover having a laterally outwardly extending apertured ear, a locking clip including a channel portion embracing a portion of said marginal wall and a laterally projecting apertured ear cooperating with said first mentioned ear, said channel portion having a slot thereinto for engaging and enclosing one of said cover securing means thereby concealing and preventing removal of the latter, retaining means engaging both of said apertured ears.

5. The combination of claim 1 including a strip of sheet material having luminous indicia upon its obverse face viewable through said glass window and having a strippable adhesive upon its reverse face by which it is releasably mounted upon said panel.

6. The combination of claim 2 including a strip of sheet material having luminous indicia upon its obverse face viewable through said open frame and having a strippable adhesive upon its reverse face by which it is releasably mounted upon said base plate.

7. The combination of claim 4 including a strip of sheet material having luminous indicia upon its obverse face viewable through said transparent pane and having a strippable adhesive upon its reverse face by which it is releasably mounted upon said base plate.

References Cited by the Examiner

UNITED STATES PATENTS

| | | | |
|---|---|---|---|
| 1,346,360 | 7/20 | White | 40—134 |
| 1,566,167 | 12/25 | Petersen et al. | 40—10 |
| 1,699,191 | 1/29 | Holmes | 40—10 |
| 1,728,731 | 9/29 | Hayes | 40—134 |
| 1,859,134 | 5/32 | Foti | 40—10 |
| 1,879,906 | 9/32 | Lindstrom. | |
| 1,966,922 | 7/34 | Coleman | 40—124.5 |
| 2,012,346 | 8/35 | Meehan | 40—200 |
| 2,046,924 | 7/36 | Pendergast | 40—125 |
| 2,182,919 | 12/39 | Hainsworth | 40—200 |
| 2,361,479 | 10/44 | Joffo | 40—10 |
| 2,387,594 | 10/45 | Hose | 40—152 |
| 2,785,490 | 3/57 | Fabry | 40—10 X |

FOREIGN PATENTS 517,042   2/53   Belgium.

JEROME SCHNALL, *Primary Examiner.*

E. V. BENHAM, *Examiner.*